United States Patent
Kaplan et al.

(10) Patent No.: US 10,042,945 B2
(45) Date of Patent: Aug. 7, 2018

(54) WEB SERVICE REQUEST VERIFICATION

(71) Applicant: INTERNATIONAL BUSINESS MACHINES CORPORATION, Armonk, NY (US)

(72) Inventors: Philippe Kaplan, Le Rouret (FR); Georges-Henri Moll, Villeneuve-Loubet (FR); Xavier Nodet, Antibes (FR); Olivier Oudot, Vallauris (FR)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 14/478,178

(22) Filed: Sep. 5, 2014

(65) Prior Publication Data
US 2015/0106688 A1    Apr. 16, 2015

(30) Foreign Application Priority Data

Oct. 10, 2013 (GB) .................................. 1317941.1

(51) Int. Cl.
*H04L 1/00* (2006.01)
*G06F 17/30* (2006.01)
*H04L 29/08* (2006.01)

(52) U.S. Cl.
CPC .......... *G06F 17/3089* (2013.01); *H04L 67/02* (2013.01); *H04L 67/146* (2013.01)

(58) Field of Classification Search
CPC ..... H04L 67/02; G06F 17/3089; G06F 17/243
See application file for complete search history.

(56) References Cited

U.S. PATENT DOCUMENTS

| | | | | |
|---|---|---|---|---|
| 6,098,093 | A * | 8/2000 | Bayeh | H04L 29/06 709/200 |
| 6,237,035 | B1 * | 5/2001 | Himmel | G06F 17/3089 709/203 |
| 6,253,326 | B1 * | 6/2001 | Lincke | G06F 17/3089 380/255 |
| 6,859,527 | B1 * | 2/2005 | Banks | H04L 29/06 370/352 |
| 6,925,459 | B2 | 8/2005 | Cornell et al. | |

(Continued)

FOREIGN PATENT DOCUMENTS

| | | | |
|---|---|---|---|
| CA | 2412629 A1 * | 10/2002 | ............ H04L 29/06 |
| WO | WO 02087174 A1 * | 10/2002 | ............ H04L 29/06 |

OTHER PUBLICATIONS

Search Report under Section 17(5); Intellectual Property Office; Application No. GB1317941.1; dated Feb. 12, 2014; 4 pages.

(Continued)

*Primary Examiner* — Scott Baderman
*Assistant Examiner* — Benjamin J Smith
(74) *Attorney, Agent, or Firm* — Schmeiser, Olsen & Watts; John Pvinichny (57) ABSTRACT

A method and Web server for verifying a Web service request originating from a Web page is provided. The method includes matching the Web service request with a Web service. A sequence ID contained in the request is identified. The Web service request is verified if the identified sequence ID does not correspond with a previous sequence ID for the matched Web service. Additionally, the Web service does not verify a same Web service request twice.

16 Claims, 7 Drawing Sheets

(56) References Cited

U.S. PATENT DOCUMENTS

| | | | |
|---|---|---|---|
| 7,099,939 B2 | 8/2006 | Von Klopp et al. | |
| 7,143,195 B2 | 11/2006 | Vange et al. | |
| 7,389,354 B1 | 6/2008 | Sitaraman et al. | |
| 7,610,400 B2* | 10/2009 | L'Heureux | H04L 67/2804 709/217 |
| 7,827,254 B1* | 11/2010 | Nevill-Manning | H04L 67/02 709/217 |
| 8,078,483 B1* | 12/2011 | Hirose | G06Q 10/02 705/1.1 |
| 2002/0083051 A1 | 6/2002 | Cornell et al. | |
| 2002/0087415 A1* | 7/2002 | Allen | G06Q 20/202 705/21 |
| 2002/0109706 A1* | 8/2002 | Lincke | G06F 17/3089 715/700 |
| 2003/0033545 A1* | 2/2003 | Wenisch | G06F 21/31 726/3 |
| 2003/0061404 A1* | 3/2003 | Atwal | G06Q 30/02 719/328 |
| 2003/0187995 A1* | 10/2003 | Fok | H04L 29/06 709/227 |
| 2004/0003351 A1* | 1/2004 | Sommerer | G06F 17/30876 715/251 |
| 2004/0167878 A1* | 8/2004 | Doddington | G06Q 30/0603 |
| 2005/0080756 A1* | 4/2005 | Hitchcock | G06F 17/243 |
| 2005/0195975 A1* | 9/2005 | Kawakita | H04L 9/0822 380/30 |
| 2006/0106727 A1* | 5/2006 | Yellai | G06F 21/10 705/59 |
| 2006/0112174 A1* | 5/2006 | L'Heureux | H04L 67/2804 709/223 |
| 2006/0123119 A1* | 6/2006 | Hill | H04L 67/14 709/227 |
| 2006/0265380 A1* | 11/2006 | Fry | G06F 17/3089 |
| 2006/0277161 A1* | 12/2006 | Sampson | G06F 17/30876 |
| 2007/0022210 A1* | 1/2007 | Roy | H04L 63/029 709/237 |
| 2007/0104326 A1* | 5/2007 | Feigenbaum | G06F 21/6227 380/44 |
| 2008/0015879 A1* | 1/2008 | Sennott | G06Q 30/0214 705/313 |
| 2008/0034424 A1* | 2/2008 | Overcash | G06F 21/55 726/22 |
| 2008/0034425 A1* | 2/2008 | Overcash | G06F 21/55 726/22 |
| 2008/0301805 A1* | 12/2008 | Bharara | G06F 19/321 726/21 |
| 2009/0055904 A1* | 2/2009 | Gomi | H04L 63/08 726/4 |
| 2009/0204881 A1* | 8/2009 | Murthy | G06F 17/243 715/226 |
| 2009/0300505 A1* | 12/2009 | Kita | G06F 17/243 715/736 |
| 2010/0057830 A1* | 3/2010 | Takala | H04W 4/02 709/203 |
| 2010/0241518 A1* | 9/2010 | McCann | G06Q 20/204 705/17 |
| 2011/0107190 A1* | 5/2011 | Henderson, Jr. | G06F 11/10 714/798 |
| 2012/0005326 A1* | 1/2012 | Bradetich | G05B 19/4185 709/223 |
| 2012/0059758 A1* | 3/2012 | Carlson | G06Q 20/10 705/39 |
| 2012/0078668 A1* | 3/2012 | Hirose | G06Q 10/02 705/5 |
| 2012/0110138 A1* | 5/2012 | Zhang | H04L 65/4084 709/219 |
| 2013/0085815 A1* | 4/2013 | Onischuk | G07C 13/00 705/12 |
| 2014/0025443 A1* | 1/2014 | Onischuk | G07C 13/00 705/12 |
| 2014/0089518 A1* | 3/2014 | Zhang | H04N 21/26258 709/231 |
| 2014/0143692 A1* | 5/2014 | Wigdor | G06F 3/0488 715/764 |
| 2014/0231512 A1* | 8/2014 | Onischuk | G07C 13/00 235/386 |
| 2015/0046562 A1* | 2/2015 | Malcolm | G06F 17/3089 709/217 |

OTHER PUBLICATIONS

Burns, Joe; Reloading the page; Retrieved from the Internet URL:http://www.htmlgoodies.com/tutorials/getting_started/article.php/3479551/Reloading-The-Page.htm;. retrieved on Jun. 11, 2014; 8 pages.

IBM; Sequenced HTTP requests; IP.com; IP.com No. IPCOM000014750D; Original Publication Date: Jul. 1, 2000; IP.com Electronic Publication: Jun. 20, 2003; 2 pages.

Wikipedia; Post/Redirect/Get; Retrieved from the Internet URL:HTTP://en.wikipedia/org/wiki/Post/Redirect/Get; Retrieved on Jun. 11, 2014; 2 pages.

Brainbell; Reloading Data and Relocation Techniques; Retrieved from the Internet URL http://www.brainbell.com/tutors/php/php_mysql/Reloading_Data_and_Relocation_Techniques.html; Retrieved on Jun. 11, 2014; 8 pages.

Help on form reload problem; The Forums; Retrieved from the Internet URL http://www.sitepoint.com/forums/showtrhead.phpp?644588-Help-on-form-reload-problem.htm; Retrieved on Jun. 11, 2014; 8 pages.

* cited by examiner

WEB SERVICE REQUEST VERIFICATION

FIELD

The present invention relates to a method and apparatus for reloading a Web server page in a Web browser, and in particular to a method and apparatus for overcoming the problem of a conflicting reload of a Web server page in a Web browser.

BACKGROUND

When a Web page is submitted to a server through an hypertext transfer protocol (HTTP) POST request or an HTTP GET request, a Web user that attempts to refresh the server response may cause the contents of the original request to be resubmitted, possibly causing undesired results, such as a duplicate Web purchase. The reload problem occurs in many situations. Actions that re-request a document from the server may include: pressing a reload or refresh button; printing or saving the uniform resource locator (URL) in the browser and returning to the page using a bookmark or favorite; using back or forward buttons; pressing an enter key in a URL location entry box; and resizing the browser window. Typically an HTTP response contains a reload request to an URL that just displays the result. Accordingly, there exists a need in the art to overcome at least some of the deficiencies and limitations described herein above.

BRIEF SUMMARY

A first aspect of the invention provides a Web server comprising a computer processor coupled to a computer-readable memory unit, a matcher component, an identifier component, and a verifier component, the memory unit comprising instructions that when executed by the computer processor implements a method for verifying a Web service request originating from a Web form, the method comprising: matching, by the computer processor executing the matcher component, the Web service request with a Web service; identifying, by the computer processor executing the identifier component, a sequence ID contained in the request; and verifying, by the computer processor executing the verifier component, the Web service request if the identified sequence ID does not correspond with an already received sequence ID for the matched Web service, wherein the Web service does not verify a same Web service request twice.

A second aspect of the invention provides a method for verifying a Web service request originating from a Web page, the method comprising: matching, by a computer processor of a Web server executing a matcher component of the Web server, the Web service request with a Web service; identifying, by the computer processor executing an identifier component of the Web server, a sequence ID contained in the request; and verifying, by the computer processor executing a verifier component of the Web server, the Web service request if the identified sequence ID does not correspond with a previous sequence ID for the matched Web service, wherein the Web service does not verify a same Web service request twice.

A third aspect of the invention provides a computer program product, comprising a computer readable hardware storage device storing a computer readable program code, the computer readable program code comprising an algorithm that when executed by a computer processor of a Web server system implements a method, the method comprising: matching, by the computer processor executing a matcher component of the Web server, the Web service request with a Web service; identifying, by the computer processor executing an identifier component of the Web server, a sequence ID contained in the request; and verifying, by the computer processor executing a verifier component of the Web server, the Web service request if the identified sequence ID does not correspond with a previous sequence ID for the matched Web service, wherein the Web service does not verify a same Web service request twice.

The present invention is able to improve the accuracy of a process for submitting a Webpage.

DETAILED DESCRIPTION

Figure 1:
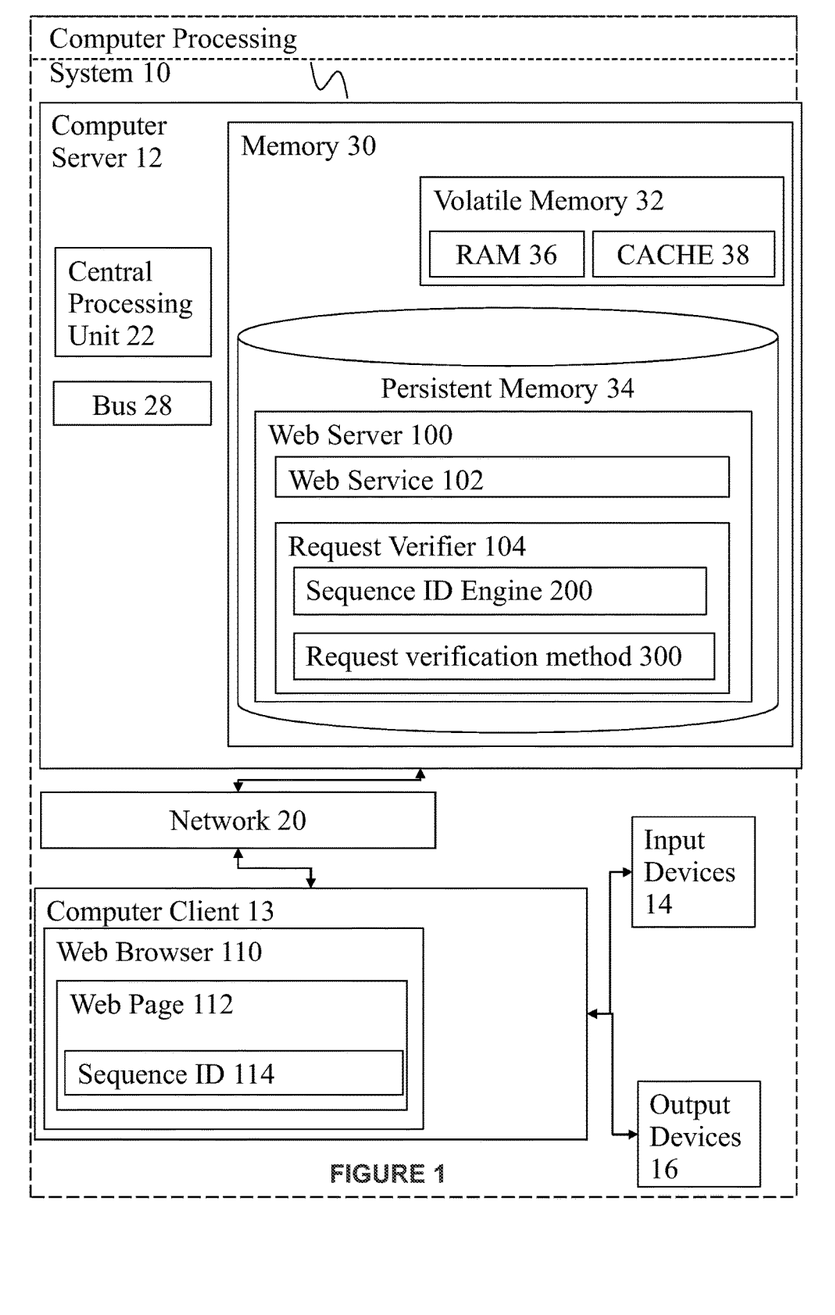
FIG. 1 illustrates a computer system deployment diagram, in accordance with embodiments of the present invention.

Referring to FIG. 1, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12, computer client 13 and one or more user input devices 14 and user output devices 16 directly attached to the computer client 13. Computer server 12 and computer client 13 are connected to a network 20 via network adapters (not shown). Input devices 14 include one or more of: a keyboard, a scanner, a mouse, trackball or another pointing device. Output devices 16 include one or more of a display or a printer. Network 20 can be a local area network (LAN), a wide area network (WAN), or the Internet.

Computer server 12 comprises: central processing unit (CPU) 22; network adapter (not shown); bus 28 and memory 30. Computer client 13 also comprises: a CPU; network adapter; bus; and memory but these are not shown.

CPU 22 loads machine instructions from memory 30 and performs machine operations in response to the instructions. Such machine operations include: incrementing or decrementing a value in register (not shown); transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

A network adapter (not shown) is connected to bus 28 and network 20 for enabling communication between the computer server 12 and network devices.

A device adapter (not shown but more relevant for computer client 13) is for enabling communication on input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the page of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprises: Web server module 100 in computer server 12 and Web browser module 110 in computer client 13. Further program modules that support the preferred embodiment but are not shown include firmware, boot strap program, operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Web server 100 comprises web service 102 and request verifier 104. Request verifier 104 comprises: sequence ID engine 200 and request verification method 300.

In operation, Web browser 110 downloads Web page 112 comprising a sequence ID 114.

Still yet, any of the components of the present invention could be created, integrated, hosted, maintained, deployed, managed, serviced, etc. by a service supplier who offers to enable a process for scoring conditions and presenting results. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for scoring conditions and presenting results. In another embodiment, the invention provides a business method that performs the process steps of the invention on a subscription, advertising, and/or fee basis. That is, a service supplier, such as a Solution Integrator, could offer to enable a process for scoring conditions and presenting results. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
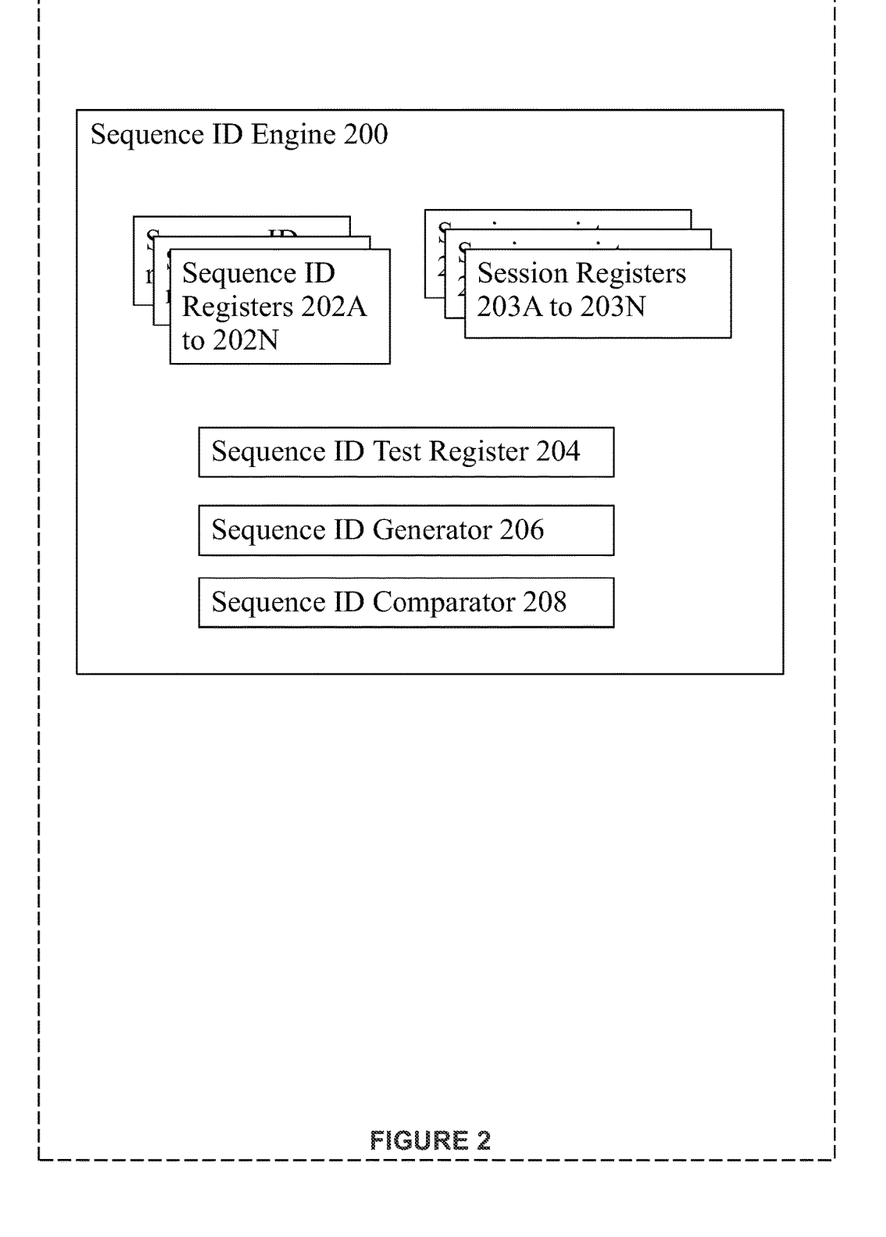
FIG. 2 illustrates a component diagram of a sequence ID, in accordance with embodiments of the present invention.

FIG. 2 illustrates a sequence ID engine 200, in accordance with embodiments of the present invention. Sequence ID engine 200 comprises: sequence ID registers 202A to 202N; corresponding session registers 203A to 203N; sequence ID test register 204; sequence ID generator 206; and a sequence ID comparator 208.

Sequence ID registers 202A to 202N are used for storing a sequence ID after it the sequence ID is generated.

Session registers 203A to 203N are associated with respective sequence ID registers 202A to 202N and are used for storing the particular user session associated with a generated sequence ID thereby allowing a sequence ID to be associated with a particular user session thereby associated with all the objects of the associated user session.

Sequence ID test register 204 is used for storing a sequence ID under test.

Sequence ID generator 206 is used for generating a sequence ID and for saving the generated sequence ID in sequence ID register 202. Sequence ID generator 206 comprises a code generator component for creating Web pages such that one or more restricted user controls are embedded in a Web page associated with sequence ID generator 206. Any Web request received from a restricted user control may include the generated sequence ID generated by the sequence ID generator.

Sequence ID comparator 208 is used for comparing the sequence ID stored in sequence ID register 202 with a sequence ID stored in sequence ID test register 204.

Sequence ID engine 200 is described in terms of a single sequence ID for simplicity, however, the embodiments are adapted to handle multiple sequence IDs.

Figure 3:
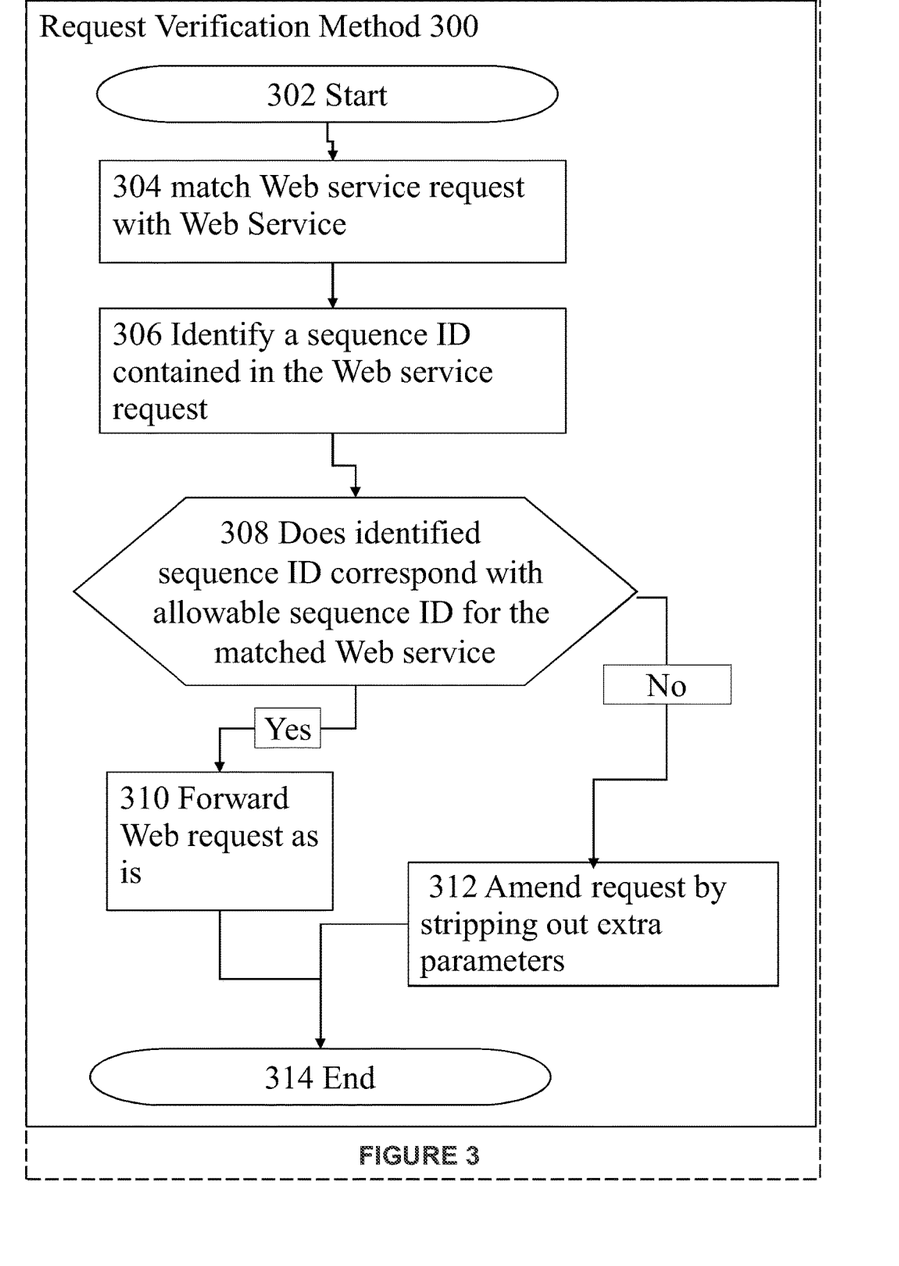
FIG. 3 illustrates a flow diagram of a process, in accordance with embodiments of the present invention.

FIG. 3 illustrates an algorithm detailing a request verification method 300, in accordance with embodiments of the present invention. The request verification method 300 comprises logical process steps 302 to 314 for carrying out the steps of an embodiment of the invention.

Step 302 comprises a start of the process.

Step 304 comprises matching a Web service request with Web service by checking the user session of the Web service.

Step 306 comprises identifying a sequence ID contained in the Web service request and loading the identified sequence ID into the sequence ID test register 204. Each sequential request for a Web service may be associated with a next sequential ID in a sequence of sequence IDs as embedded respectively in a Web page and the Web service.

Step 308 comprises checking if the identified sequence ID corresponds with allowable sequence ID for the matched Web service. A look up is performed using the session registers 203A to 203N to locate associated sequence registers from sequence ID registers 202A to 202N. Sequence ID comparator 208 compares the sequence ID in the associated sequence register with the sequence ID in sequence ID test register 204. If the sequence IDs corresponds or matches then step 310. If the sequence IDs do not correspond or match then step 312.

Step 310 comprises allowing the Web request to proceed as it is and the process is terminated in step 314.

Step 312 comprises amending the request by stripping out extra parameters from the request and the process is terminated in step 314. The Web service request may be suppressed (by a suppressor component of e.g., request verifier 104) if the Web service request is not verified (by request verifier 104) thereby removing the extra (critical) parameters from the Web service request before the request is passed on to a Web service.

Figure 4:
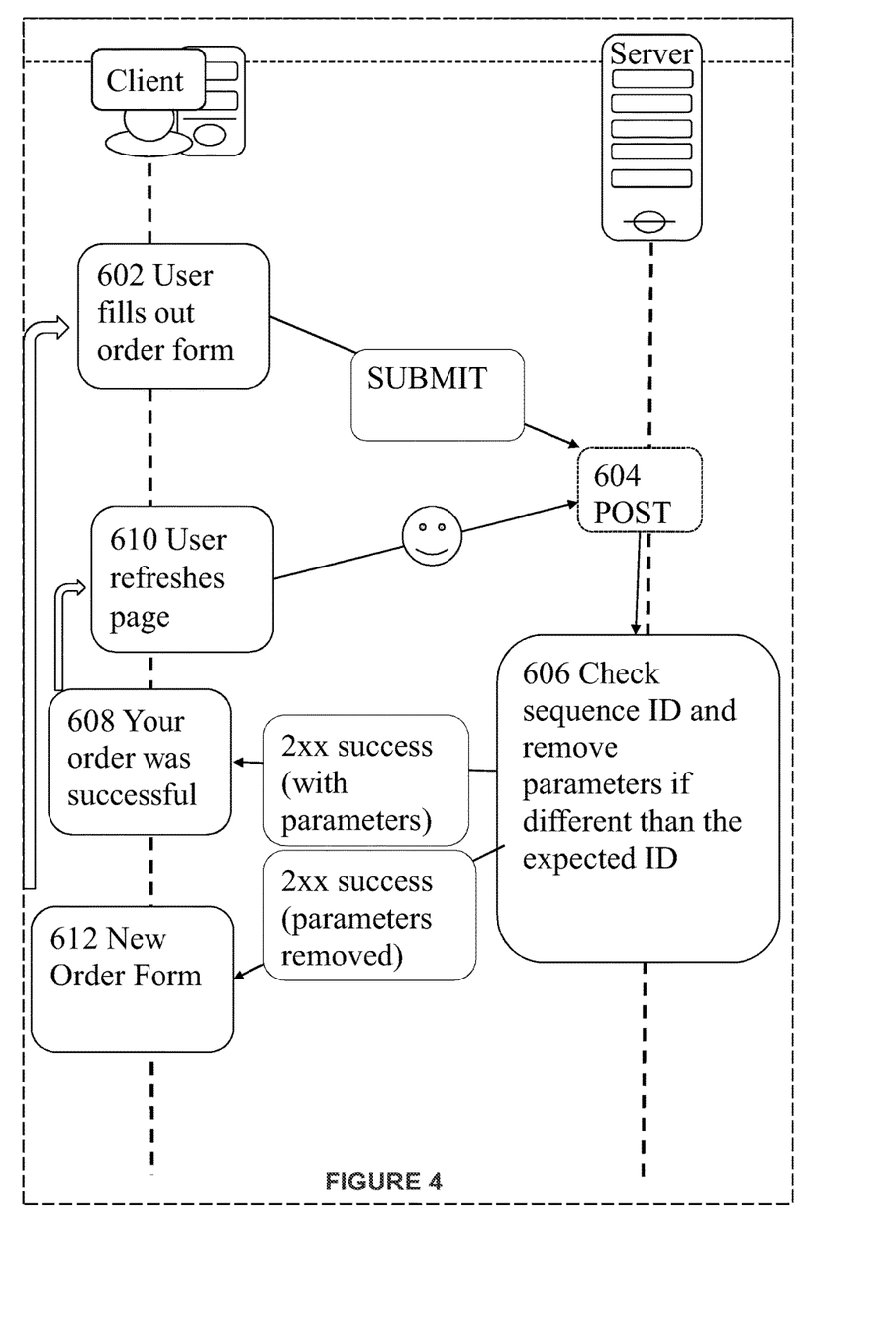
FIG. 4 illustrates an interaction diagram, in accordance with embodiments of the present invention.

FIG. 4 illustrates an algorithm detailing an example interaction in accordance with embodiments of the present invention. The algorithm of FIG. 4 comprises steps 602 to 612 with respect to a single request.

In step 602, a user fills out an order form on a computer client and clicks a submit request. A Web SUBMIT command is sent from the computer client to a Web service on a server computer.

In step 604, the Web service receives the SUBMIT command and initiates a POST Command. Nothing is sent back to the client at this stage and nothing is cached.

In step 606, the Web Service checks a sequence ID against an expected ID. If the sequence ID differs from the expected ID, then the parameters in the SUBMIT command are removed. The server sends a confirmation page containing a 2xx success code. If the URL contains the parameters then step is 608 is executed. If the parameters are removed then step 612 is executed.

In step 608, when the URL contains parameters, the client displays a successful order page. If the user refreshes the page then step 610 is executed.

In step 610, the user (accidently or intentionally) refreshes the Web page displaying the order form. However, since the parameters in the submit command have been removed then the process recycles from step 604.

In step 612, (when the URL does not contain parameters) the client displays a new order form. If the user fills in the form then the user repeats step 602.

Figure 5:
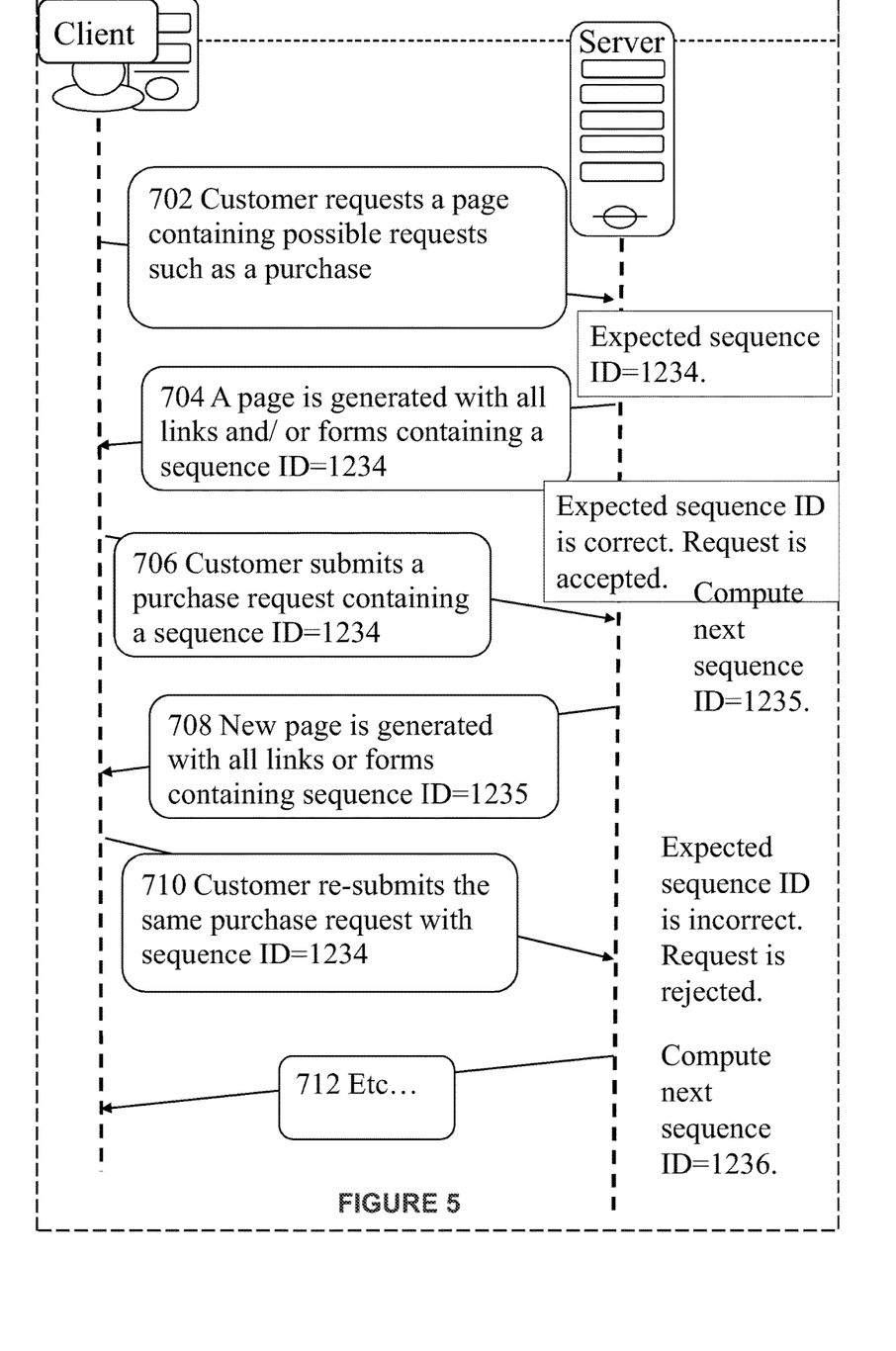
FIG. 5 illustrates a more detailed interaction diagram, in accordance with embodiments of the present invention.

FIG. 5 illustrates an algorithm detailing a further example interaction diagram, in accordance with embodiments of the present invention. The algorithm of FIG. 5 includes an example sequence ID comprising steps 702 to 712.

In step 702, a customer requests a page containing possible context modification requests such as a purchase. The server generates an expected sequence ID of 1234.

In step 704, a page is generated with all links or forms containing a sequence ID=1234

In step 706, the customer submits a purchase request containing a sequence ID=1234. The expected sequence ID is correct and the request is accepted. The next sequence ID is computed as 1235. The next sequence ID of a sequence of sequence IDs may comprise a simple arithmetical progression.

In step 708, a new page is generated with all links or forms containing sequence ID=1235.

In step 710, the customer re-submits the same purchase request with sequence ID=1234. This time the expected sequence ID is incorrect and the request is rejected. The next sequence ID=1236 is computed. Therefore each sequential request for a Web service is associated with a next sequential ID in a sequence of sequence IDs as embedded respectively in a Web page and the Web service.

In step 712, the process is repeated.

Figure 6A:
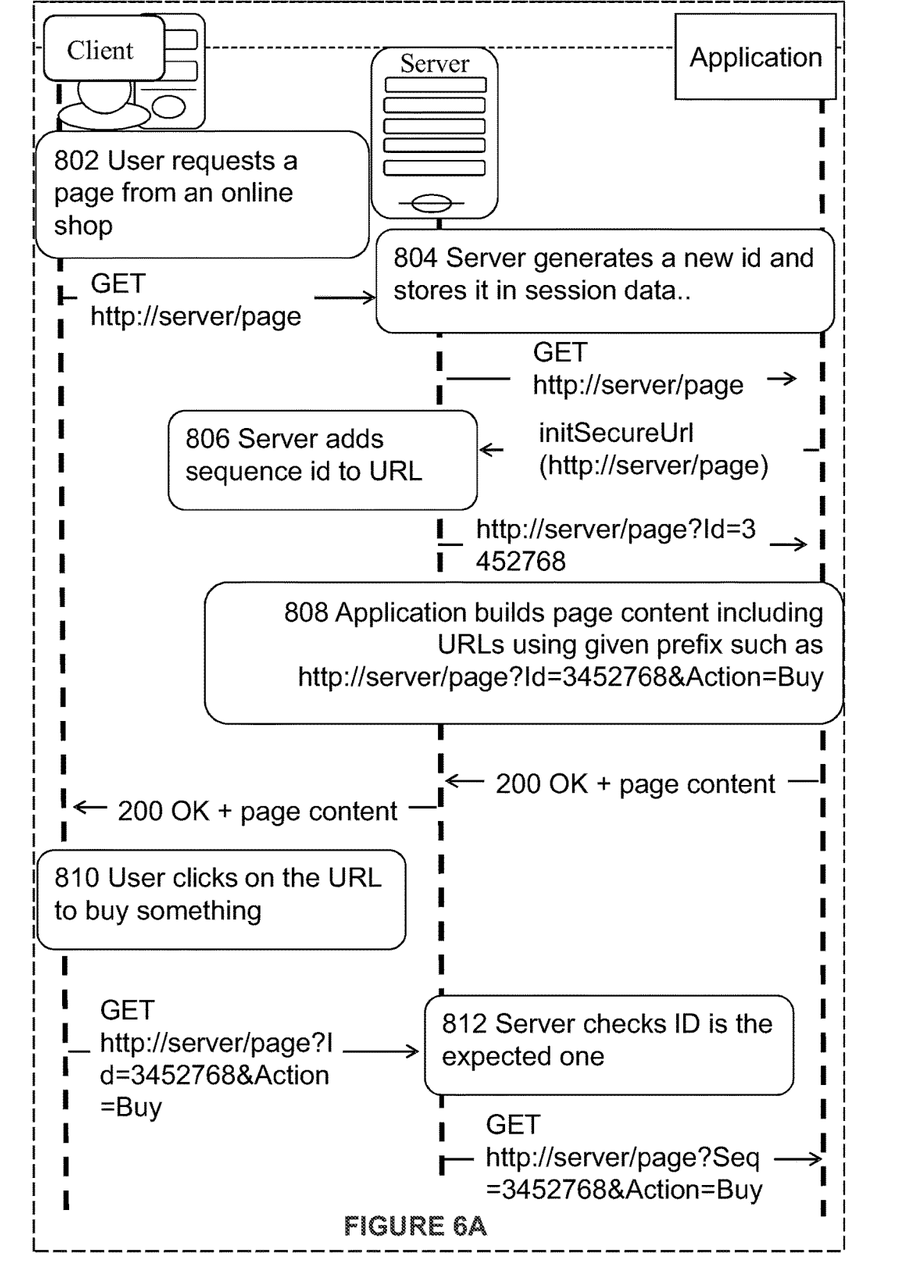
FIGS. 6A and 6B illustrate an example interaction diagram, in accordance with embodiments of the present invention.

FIGS. 6A and 6A, in combination, illustrate an algorithm detailing a further example interaction diagram, in accordance with embodiments of the present invention. The algorithms of FIGS. 6A and 6B comprise steps 802 to 824 with particular attention to an application interaction and an example URL.

In step 802, a user requests a page for an online shop. In response, A HTTP GET command (http://server/page) is sent from the client to the server requesting the page.

In step 804, the server generates a new sequence ID and stores it as session data. The HTTP GET command is forwarded to the application and a secure URL (initSecureUrl http://server/page) is sent back to the server. A code generator is generated. The code generator is configured to embed one or more restricted user controls in a Web page associated with a sequence ID generator (e.g., sequence ID generator 206 of FIG. 2) internal to sequence ID software engine 200 (of FIG. 2). Any Web request received from a restricted user control includes the sequence ID generated by the sequence ID generator. Each sequential request for the Web service is associated with a next sequential ID in a sequence of sequence IDs as embedded respectively in the Web page and the Web service.

In step 806, the server adds the sequence ID to the URL (http://server/page?Id=3452768)

In step 808, the application builds page content including URLs using given prefix such as http://server/page?Id=3452768&Action=Buy. The application responds by sending an HTTP 200 Okay message plus the page content and the server forwards this response to the client.

In step 810, a user clicks on the URL to buy a referenced article. The client sends an HTTP GET command including the URL to the server (GET http://server/page?Id=3452768&Action=Buy).

In step 812, the server checks that the sequence ID is the expected one and forwards the command to the application.

In step 814, the application performs the required action and builds a response page. An HTTP OK signal is sent back to the server (200 OK+page content).

Figure 6B:
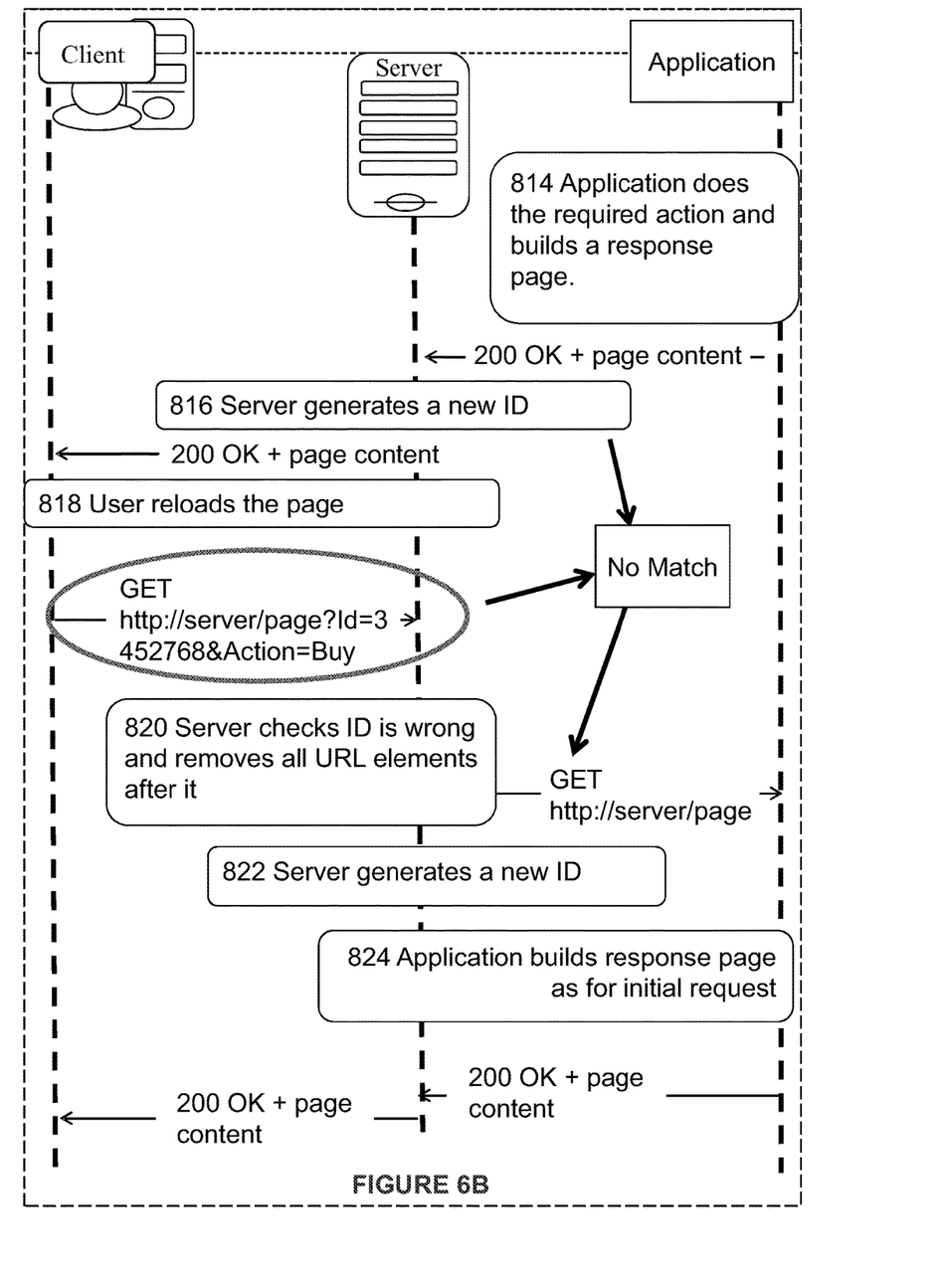

In step 816, the server generates a new ID and sends it to the client (200 OK plus page content).

In step 818, the user reloads the page by sending an HTTP Get signal to the server. GET http://server/page?Id=3452768&Action=Buy.

In step 820, the server checks the sequence ID and upon determining that the sequence ID is an old sequence ID (by check prior sequence IDs) or determining that it is not the same ('No match') as the newly generated ID then in step 816, the server removes all elements after the URL (in this case the elements '?Id=3452768&Action=Buy') and sends the stripped down URL to the application (GET http://server/page).

In step 822, the server generates a new sequence ID.

In step 824, the application builds response page for stripped down URL request and sends an HTTP message signal 200 OK plus the page content to the server. The server forwards the HTTP message to the client.

Whilst a particular advantage of the preferred embodiment is that the solution is transparent to the Web service, in a further embodiment it is possible to perform the invention without stripping out the extra parameters of the request and instead passing the request 'as is' to the Web service 102. In this case the application would understand that the sequence ID was not verified and would then ignore the extra elements in the URL.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

It will be clear to one skilled in the art that many improvements and modifications can be made to the foregoing exemplary embodiment without departing from the scope of the present invention.

The invention claimed is:

1. A Web server comprising a computer processor coupled to a computer-readable memory unit comprising a sequence ID software engine, a matcher component, an identifier component, and a verifier component, said memory unit comprising instructions that when executed by the computer processor implements a method for verifying a Web service request originating from a Web form, said method comprising:

matching, by said computer processor executing said matcher component, the Web service request with a Web service;

storing, by said processor, a sequence ID as session data in a sequence ID register internal to said sequence ID software engine;

adding, by said processor, said sequence ID to a URL;

building, by said processor, Webpage content comprising said URL and associated with said Web form;

identifying, by said computer processor executing said identifier component, said sequence ID contained in the request;

loading, by said computer processor, said identified sequence ID into a sequence ID test register within said sequence ID software engine;

verifying, by said computer processor executing said verifier component, the Web service request if the identified sequence ID does not correspond with an already received sequence ID for the matched Web service, wherein the Web service does not verify a same Web service request twice, and wherein said verifying comprises:

performing a look up process via usage of a plurality of session registers, internal to said sequence ID software engine, for locating associated sequence registers associated with said identified sequence ID;

comparing, by a comparator internal to said sequence ID software engine, the already received sequence ID within an associated sequence register of said associated sequence registers with the identified sequence ID within the sequence ID test register;

removing parameters from a SUBMIT command;

transmitting a confirmation page comprising a success code;

refreshing an original Web page displaying an order form; and displaying a new order form;

removing, by said processor based on results of said verifying, elements of said sequence ID from said URL;

generating, by said processor, in response to results of said removing, a new sequence ID;

generating, by said processor, a response Web page associated with said URL with said elements removed during said removing, wherein said response Web page differs from an original Web page associated with said sequence ID;

reloading, by said processor, said response Webpage via transmission of an HTTP signal to a server;

forwarding, by said processor to a client server, an HTTP message associated with said response Web page; and embedding, by said computer processor executing a code generator, one or more restricted user controls in a Web page associated with a sequence ID generator internal to said sequence ID software engine, wherein any Web request received from a restricted user control includes said sequence ID generated by the sequence ID generator, and wherein each sequential request for the Web service is associated with a next sequential ID in a sequence of sequence IDs as embedded respectively in the Web page and the Web service.

2. The Web server of claim 1, further comprising a suppressor component, and wherein said method further comprises:
  suppressing, by said computer processor executing said suppressor component, the Web service request, if the Web service request is not verified, by removing critical parameters from the Web service request before the request is passed on to Web service.

3. The Web server of claim 1, wherein the Web service ignores extra parameters in the Web service request if the Web service request has not been verified.

4. The Web server of claim 1, wherein said sequence ID is determined by a sequence ID generator.

5. The Web server of claim 1, wherein the sequence of sequence IDs comprises a simple arithmetical progression.

6. The Web server of claim 1, wherein the sequence ID comprises a generated token.

7. The Web server of claim 1, wherein the sequence ID is associated with a particular user session.

8. A method for verifying a Web service request originating from a Web page, the method comprising:
  matching, by a computer processor of a Web server executing a matcher component of the Web server, the Web service request with a Web service, wherein said Web server comprises a sequence ID software engine, said matcher component, an identifier component, and a verifier component;
  storing, by said processor, a sequence ID as session data in a sequence ID register internal to said sequence ID software engine;
  adding, by said processor, said sequence ID to a URL;
  building, by said processor, Webpage content comprising said URL and associated with said Web form;
  identifying, by said computer processor executing said identifier component, said sequence ID contained in the request;
  loading, by said computer processor, said identified sequence ID into a sequence ID test register within said sequence ID software engine;
  verifying, by said computer processor executing said verifier component, the Web service request if the identified sequence ID does not correspond with an already received sequence ID for the matched Web service, wherein the Web service does not verify a same Web service request twice, and wherein said verifying comprises:
  performing a look up process via usage of a plurality of session registers, internal to said sequence ID software engine, for locating associated sequence registers associated with said identified sequence ID;
  comparing, by a comparator internal to said sequence ID software engine, the already received sequence ID within an associated sequence register of said associated sequence registers with the identified sequence ID within the sequence ID test register;
  removing parameters from a SUBMIT command;
  transmitting a confirmation page comprising a success code;
  refreshing an original Web page displaying an order form; and
  displaying a new order form;
  removing, by said processor based on results of said verifying, elements of said sequence ID from said URL;
  generating, by said processor, in response to results of said removing, a new sequence ID;
  generating, by said processor, a response Web page associated with said URL with said elements removed during said removing, wherein said response Web page differs from an original Web page associated with said sequence ID;
  reloading, by said processor, said response Webpage via transmission of an HTTP signal to a server;
  forwarding, by said processor to a client server, an HTTP message associated with said response Web page; and
  embedding, by said computer processor executing a code generator, one or more restricted user controls in a Web page associated with a sequence ID generator internal to said sequence ID software engine, wherein any Web request received from a restricted user control includes said sequence ID generated by the sequence ID generator, and wherein each sequential request for the Web service is associated with a next sequential ID in a sequence of sequence IDs as embedded respectively in the Web page and the Web service.

9. The method of claim 8, further comprising:
  suppressing, by said computer processor executing a suppressor component of the Web server, the Web service request, if the Web service request is not verified, by removing critical parameters from the Web service request before the request is passed on to Web service.

10. The method of claim 8, wherein the Web service ignores extra parameters in the Web service request if the Web service request has not been verified.

11. The method of claim 8, wherein said sequence ID is determined by a sequence ID generator.

12. The method of claim 8, wherein the sequence of sequence IDs comprises a simple arithmetical progression.

13. The method of claim 8, wherein the sequence ID comprises a generated token.

14. The method of claim 8, wherein the sequence ID is associated with a particular user session.

15. The method of claim 8, further comprising:
  providing at least one support service for at least one of creating, integrating, hosting, maintaining, and deploying computer-readable code in the computing system, said code being executed by the computer processor to implement said matching, said identifying, and said verifying.

16. A computer program product, comprising a non-transitory computer readable hardware storage device storing a computer readable program code, said computer readable program code comprising an algorithm that when executed by a computer processor of a Web server system implements a method, said method comprising:
  matching, by the computer processor executing a matcher component of the Web server, the Web service request with a Web service, wherein said Web server comprises a sequence ID software engine, said matcher component, an identifier component, and a verifier component;
  storing, by said processor, a sequence ID as session data in a sequence ID register internal to said sequence ID software engine;
  adding, by said processor, said sequence ID to a URL;

building, by said processor, Webpage content comprising said URL and associated with said Web form;
identifying, by said computer processor executing said identifier component, said sequence ID contained in the request;
loading, by said computer processor, said identified sequence ID into a sequence ID test register within said sequence ID software engine;
verifying, by said computer processor executing said verifier component, the Web service request if the identified sequence ID does not correspond with an already received sequence ID for the matched Web service, wherein the Web service does not verify a same Web service request twice, and wherein said verifying comprises:
performing a look up process via usage of a plurality of session registers, internal to said sequence ID software engine, for locating associated sequence registers associated with said identified sequence ID;
comparing, by a comparator internal to said sequence ID software engine, the already received sequence ID within an associated sequence register of said associated sequence registers with the identified sequence ID within the sequence ID test register;
removing parameters from a SUBMIT command;
transmitting a confirmation page comprising a success code;
refreshing an original Web page displaying an order form; and
displaying a new order form;
removing, by said processor based on results of said verifying, elements of said sequence ID from said URL;
generating, by said processor, in response to results of said removing, a new sequence ID;
generating, by said processor, a response Web page associated with said URL with said elements removed during said removing, wherein said response Web page differs from an original Web page associated with said sequence ID;
reloading, by said processor, said response Webpage via transmission of an HTTP signal to a server;
forwarding, by said processor to a client server, an HTTP message associated with said response Web page; and
embedding, by said computer processor executing a code generator, one or more restricted user controls in a Web page associated with a sequence ID generator internal to said sequence ID software engine, wherein any Web request received from a restricted user control includes said sequence ID generated by the sequence ID generator, and wherein each sequential request for the Web service is associated with a next sequential ID in a sequence of sequence IDs as embedded respectively in the Web page and the Web service.

* * * * *